United States Patent
Khosrowpour et al.

(10) Patent No.: US 10,997,052 B2
(45) Date of Patent: May 4, 2021

(54) METHODS TO ASSOCIATE WORKLOADS TO OPTIMAL SYSTEM SETTINGS BASED UPON STATISTICAL MODELS

(71) Applicant: Dell Products L.P., Round Rock, TX (US)

(72) Inventors: Farzad Khosrowpour, Pflugerville, TX (US); Nikhil Vichare, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 37 days.

(21) Appl. No.: 15/583,078

(22) Filed: May 1, 2017

(65) Prior Publication Data

US 2018/0314617 A1    Nov. 1, 2018

(51) Int. Cl.
G06F 11/34 (2006.01)
G06F 9/50 (2006.01)
G06F 11/30 (2006.01)

(52) U.S. Cl.
CPC .......... *G06F 11/3452* (2013.01); *G06F 9/505* (2013.01); *G06F 11/301* (2013.01); *G06F 11/3051* (2013.01); *G06F 11/3433* (2013.01)

(58) Field of Classification Search
None
See application file for complete search history.

(56) References Cited

U.S. PATENT DOCUMENTS

| | | | |
|---|---|---|---|
| 7,401,012 B1 * | 7/2008 | Bonebakker | G06F 11/3428 703/2 |
| 7,685,413 B2 * | 3/2010 | Peterman | G06F 9/44505 713/1 |
| 8,276,112 B2 * | 9/2012 | Fritzsche | G06F 11/3447 717/104 |
| 8,321,362 B2 * | 11/2012 | Carrizo | G06F 11/3452 706/45 |
| 8,387,059 B2 * | 2/2013 | Chang | G06F 9/5083 718/104 |
| 9,043,788 B2 | 5/2015 | Garrett et al. | |
| 9,336,302 B1 * | 5/2016 | Swamy | G06F 16/355 |
| 9,477,287 B1 * | 10/2016 | Schow | G06F 1/3206 |
| 9,588,820 B2 | 3/2017 | Ravi et al. | |
| 9,799,041 B2 * | 10/2017 | Karty | G06N 3/126 |
| 9,848,041 B2 * | 12/2017 | Einkauf | G06F 9/5077 |
| 9,996,389 B2 * | 6/2018 | Caufield | G06F 9/4843 |
| 10,061,233 B2 * | 8/2018 | Damgar | G06F 9/505 |

(Continued)

OTHER PUBLICATIONS

Farzad Khosrowpour et al., U.S. Appl. No. 15/719,789, filed Sep. 29, 2017, entitled Application Profiling via Loopback Method.

(Continued)

*Primary Examiner* — Abu Zar Ghaffari (74) *Attorney, Agent, or Firm* — Terrile, Cannatti & Chambers; Stephen A. Terrile (57) ABSTRACT

A system, method, and computer-readable medium are disclosed for optimizing performance of an information handling system comprising: identifying a statistical model for use when optimizing performance of the information handling system; sampling the performance of the information handling system, the sampling being performed iteratively; and, adjusting the performance of the information handling system by applying optimized system configurations to the information handling system, the optimized parameters being based upon the statistical model.

13 Claims, 7 Drawing Sheets

(56) References Cited

U.S. PATENT DOCUMENTS

| | | | | |
|---|---|---|---|---|
| 2002/0188580 | A1* | 12/2002 | Doddi | G03F 7/70625 706/20 |
| 2005/0262230 | A1* | 11/2005 | Liu | G06F 11/3452 709/223 |
| 2007/0028217 | A1* | 2/2007 | Mishra | G06F 11/3688 717/124 |
| 2007/0282567 | A1* | 12/2007 | Dawson | G06F 11/3414 702/186 |
| 2008/0098254 | A1* | 4/2008 | Altevogt | G06F 1/3203 713/600 |
| 2009/0112780 | A1* | 4/2009 | Chen | G06F 9/44505 706/19 |
| 2010/0063948 | A1* | 3/2010 | Virkar | G06N 99/005 706/12 |
| 2011/0010361 | A1* | 1/2011 | Burger | G06F 16/24542 707/719 |
| 2011/0060827 | A1* | 3/2011 | Corley | G06F 9/5083 709/224 |
| 2012/0310618 | A1* | 12/2012 | B'Far et al. | G06F 11/302 703/13 |
| 2013/0041989 | A1* | 2/2013 | Boss | G06F 9/5044 709/223 |
| 2013/0254196 | A1* | 9/2013 | Babu | G06F 17/30595 707/736 |
| 2014/0122387 | A1* | 5/2014 | Chi | G06N 99/005 706/12 |
| 2015/0160098 | A1* | 6/2015 | Noda | G05B 23/024 702/35 |
| 2015/0227452 | A1* | 8/2015 | Raghavan | G06F 11/3684 717/124 |
| 2016/0140028 | A1* | 5/2016 | Woodward | G06F 11/3688 717/124 |
| 2016/0357840 | A1* | 12/2016 | Odashima | G06F 16/283 |
| 2016/0378847 | A1* | 12/2016 | Byrnes | G06F 16/93 707/739 |
| 2017/0153962 | A1* | 6/2017 | Biegun | G06F 11/3409 |
| 2018/0024859 | A1* | 1/2018 | Doshi | G06N 20/00 718/104 |
| 2018/0102953 | A1* | 4/2018 | Mahindru | H04L 43/08 |
| 2018/0189675 | A1* | 7/2018 | Nurvitadhi | G06F 16/285 |
| 2018/0314617 | A1* | 11/2018 | Khosrowpour | G06F 11/3476 |

OTHER PUBLICATIONS

Farzad Khosrowpour et al., U.S. Appl. No. 15/499,050, filed Apr. 27, 2017, entitled System Performance Measurement of Stochastic Workloads.

Lenovo, Performance Tuner Software, printed Aug. 21, 2017, thinkworkstationsoftware.com/download.html.

Kleinosowski et al., MinneSPEC: A New SPEC Benchmark Workload for Simulation-Based Computer Architecture Research, University of Minnesota ARCTiC Labs technical report No. 02-08, Oct. 2002, 4 pages.

John, Lizy Kurian, More on finding a single number to indicate overall performance of a benchmark suite, AMC SIGARCH Computer Architecture News, vol. 32, Issue 1, Mar. 2004, pp. 3-8.

Jain, Raj, The Art of Computer Systems Performance Analysis: Techniques for Experimental Design, Measurement, Simulation, and Modeling, 1991, 714 pages.

* cited by examiner

| Bench mark | Application | System Configuration ||||||| Optimal Settings |||
|---|---|---|---|---|---|---|---|---|---|---|
| | | CPU | Mem | Storage | Video | Network | ... | Hyper Threading | Vsync | Power Save |
| B1 | Autocad | | | | | | | 1 | 0 | 0 |
| B2 | Flowtherm | | | | | | | 0 | 1 | 0 |
| B1 | ... | | | | | | | 0 | 0 | 1 |
| B2 | | | | | | | | 1 | 1 | 0 |
| B3 | | | | | | | | | | |
| B4 | | | | | | | | | | |
| B1 | | | | | | | | | | |
| | | | | | | | | | | |
| | | | | | | | | | | |

*Figure 5*

| Bench mark | Application | System Configuration |||||| Instrumentation Data (Features) ||||| | Optimal Settings |||
|---|---|---|---|---|---|---|---|---|---|---|---|---|---|---|---|---|
| | | CPU | Mem | Storage | Video | Network | ... | Core Utilization | Turbo Residency | L2 Cache hits | HDD Writes | GPU Util | ... | Hyper Threading | Vsync | Power Save |
| B1 | Autocad | | | | | | | | | | | | | 1 | 0 | 0 |
| B2 | Flowtherm | | | | | | | | | | | | | 0 | 1 | 0 |
| B1 | ... | | | | | | | | | | | | | 0 | 0 | 1 |
| B2 | | | | | | | | | | | | | | 1 | 1 | 0 |
| B3 | | | | | | | | | | | | | | | | |
| B4 | | | | | | | | | | | | | | | | |
| B1 | | | | | | | | | | | | | | | | |

*Figure 6*

| | System Configuration | | | | | | Instrumentation Data (Features) | | | | | | Optimal Settings | | | |
|---|---|---|---|---|---|---|---|---|---|---|---|---|---|---|---|---|
| Bench mark | Application | CPU | Mem | Stor age | Vid eo | Net wor k | ... | Core Utiliza tion | Turbo Resid ency | L2 Cache hits | HDD Writes | GPU Util | ... | Hyper Threa ding | Vsync | Power Save | Cluster Id |
| B1 | Autocad | | | | | | | | | | | | | 1 | 0 | 0 | K1 |
| B2 | Flowtherm | | | | | | | | | | | | | 0 | 1 | 0 | K1 |
| B1 | | | | | | | | | | | | | | 0 | 0 | 1 | K2 |
| B2 | | | | | | | | | | | | | | 1 | 1 | 0 | K1 |
| B3 | | | | | | | | | | | | | | | | | K3 |
| B4 | | | | | | | | | | | | | | | | | K1 |
| B1 | | | | | | | | | | | | | | | | | |

*Figure 7*

| | Optimal Settings | | |
|---|---|---|---|
| Cluster id | HyperThre ading | Vsync | PowerSav e |
| K1 | | | |
| K2 | | | |
| K3 | | | |
| K4 | | | |

| System Configuration | | | | | | Instrumentation Data (Features) | | | | | Settings | | | |
|---|---|---|---|---|---|---|---|---|---|---|---|---|---|---|
| Bench mark | Application | CPU | Mem ory | Stor age | Vid eo | Net wor k | Core Utiliza tion | Turbo Resid ency | L2 Cache hits | HDD Writes | GPU Util | Hyper Threa ding | Vsyn c | Power Save | Labels |
| B1 | Autocad | | | | | | | | | | | 1 | 0 | 0 | 100 |
| B1 | Autocad | | | | | | | | | | | 0 | 0 | 1 | 001 |
| B2 | Flowtherm | | | | | | | | | | | 0 | 1 | 0 | 010 |
| B1 | | | | | | | | | | | | 0 | 0 | 1 | 001 |
| B2 | | | | | | | | | | | | 1 | 1 | 0 | 110 |
| B4 | | | | | | | | | | | | | | | |
| B1 | | | | | | | | | | | | | | | |

↔ Optimal Setting
↔ Non Optimal setting

*Figure 10*

METHODS TO ASSOCIATE WORKLOADS TO OPTIMAL SYSTEM SETTINGS BASED UPON STATISTICAL MODELS

BACKGROUND OF THE INVENTION

Field of the Invention

The present invention relates to information handling systems. More specifically, embodiments of the invention relate to optimizing system performance of information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

With certain information handling systems, different applications can leverage system resources including hardware resources differently. Some applications may be multi-threaded and some applications may be single threaded. Some applications can benefit from a faster CPU speed and others from faster IO performance (e.g., due to transactional access to storage). Some applications may benefit from whether Vertical synchronization (Vsync) is set on or off. It is known to adjust system resources including hardware resources prior to providing a system to a customer for a particular application based upon static benchmark and workload analysis based characteristics for that application. It is also known to provide a plurality of static profiles that may be used to adjust certain system resources in a pre-defined manner.

SUMMARY OF THE INVENTION

A system, method, and computer-readable medium are disclosed for optimizing performance of an information handling system comprising: identifying a statistical model for use when optimizing performance of the information handling system; sampling the performance of the information handling system, the sampling being performed iteratively; and, adjusting the performance of the information handling system by applying optimized system configurations to the information handling system, the optimized parameters being based upon the statistical model.

In certain embodiments, the performance optimization operation uses statistical models and iterative sampling and adjustment to optimize performance of a system. Such a performance optimization operation takes into account complexities in dynamically adjusting system configurations for varying workloads such as random stochastic variation in workload, abrupt user or operating system level discontinuities in the jobs, as well as instantaneous measurements and changes that otherwise might result in false triggers. The performance optimization operation leverages existing instrumentations used in a laboratory setting to build the statistical behavioral model. In certain embodiments, the performance optimization operation characterizes workloads in operation at runtime to analyze the performance of the system and to identify what parameters should be changed to obtain optimal performance. In certain embodiments, the performance optimization operation comprises a classification operation which classifies workloads (including known workloads and unknown workloads) into pre-defined performance clusters. In certain embodiments, the classification operation maps optimal parameter settings to clusters of performance profiles. In certain embodiments, the performance optimization operation comprises a supervised learning operation which identifies optimal parameter settings via supervised learning. In certain embodiments, the supervised learning operation statistically maps system parameters to optimal parameter settings.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 10 shows an example association of performance benchmarks with particular types of loads.

DETAILED DESCRIPTION

Various aspects of the disclosure include an appreciation that predefined profiles may not easily scale to support a wide variety of independent software vendor (ISV) applications and workloads that are run by customers. Various aspects of the disclosure include an appreciation that benchmark solutions may be limited in characterizing application concurrency. Accordingly, it is desirable to provide performance optimization operations that take into account mixed workloads (i.e., a plurality of concurrently executing applications). For example, one known optimization operation provides 22 profiles/recommendations with preconfigured system settings setting that are based on tests at a supplier and include certain pre-identified applications.

Various aspects of the disclosure include an appreciation that there is a need to automatically detect workload profiles in the field, regardless of the application, on the customer's system and provide a recommendation for optimal settings. Various aspects of the disclosure provide a performance optimization operation that improves how workloads are characterized by dynamically characterizing the workloads. Various aspects of the disclosure provide a performance optimization operation that iteratively makes performance optimization adjustments iteratively rather than statically such as when selecting a specific performance optimization profile.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
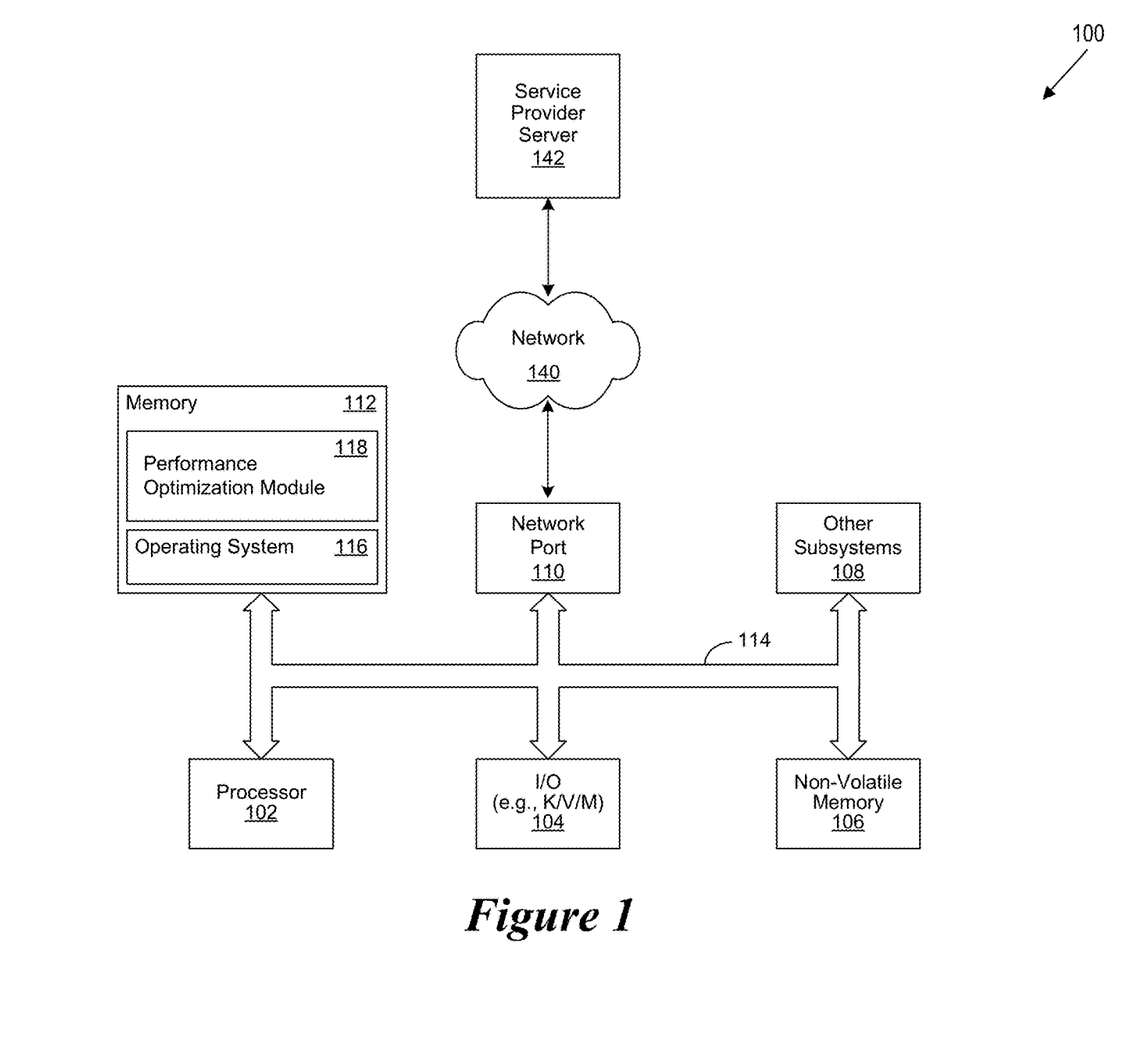
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a performance optimization module 118.

The performance optimization module 118 performs a performance optimization operation. The performance optimization operation improves the efficiency of the information handling system 100 by optimizing the performance of the information handling system when executing mixed workloads. As will be appreciated, once the information handling system 100 is configured to perform the performance optimization operation, the information handling system 100 becomes a specialized computing device specifically configured to perform the performance optimization operation and is not a general purpose computing device. Moreover, the implementation of the performance optimization operation on the information handling system 100 improves the functionality of the information handling system and provides a useful and concrete result of improving the performance of the information handling system when the information handling system 100 when executing mixed workloads.

In various embodiments, the performance optimization operation uses statistical models and iterative sampling and adjustment to optimize performance of a system. Such a performance optimization operation takes into account complexities in dynamically adjusting system configurations for varying workloads such as random stochastic variation in workload, abrupt user or operating system level discontinuities in the jobs, as well as instantaneous measurements and changes that otherwise might result in false triggers. The performance optimization operation leverages existing instrumentations used in a laboratory setting to build the statistical behavioral model. In certain embodiments, the statistical behavioral model comprises a machine learning model. In certain embodiments, the performance optimization operation characterizes workloads in operation at runtime to analyze the performance of the system and to identify what parameters should be changed to obtain optimal performance. In certain embodiments, the performance optimization operation comprises a classification operation which classifies workloads (including known workloads and unknown workloads) into predefined performance clusters. In certain embodiments, each workload has a corresponding label. For example a workload that is processor intensive and low on memory use and storage use may be labelled a High CPU workload. Examples of other labels for different types of workloads can include "balanced," "high IO," "mem high," etc. The machine learning model is trained on multiple workloads with known labels. The workloads the customer executes on their system are unknown workloads. In certain embodiments, the machine learning model monitors data about this workload and determines an appropriate label. In certain embodiments, the classification operation maps optimal parameter settings to clusters of performance profiles. In certain embodiments, the performance optimization operation comprises a supervised learning operation which identifies optimal parameter settings via supervised learning. In certain embodiments, the supervised learning operation statistically maps system parameters to optimal parameter settings.

Figure 2:
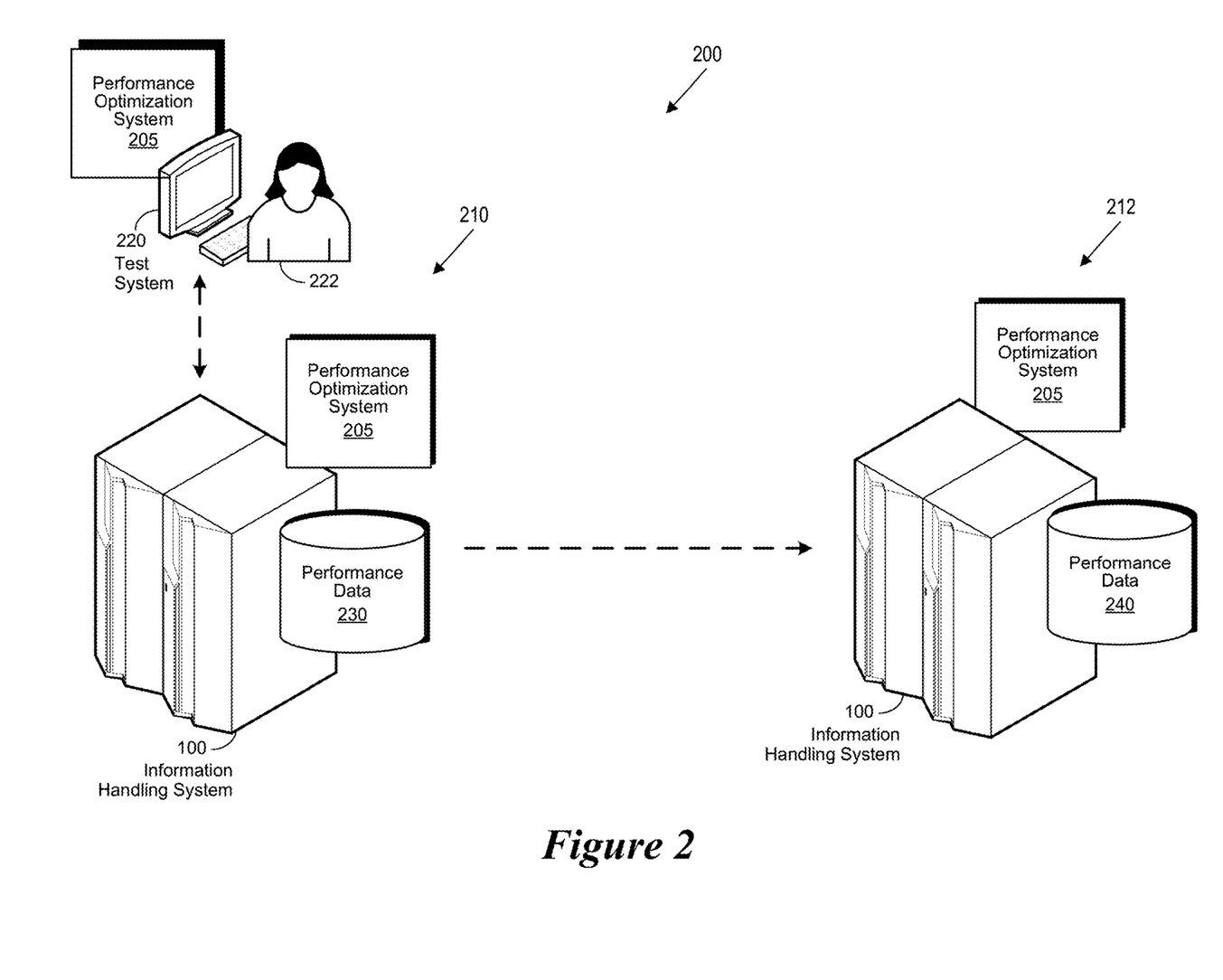
FIG. 2 shows a block diagram of a performance optimization environment.

FIG. 2 shows a block diagram of a performance optimization environment 200. In various embodiments, the performance optimization environment 200 includes one or more performance optimization systems 205 each of which may perform some or all of the functions of the performance optimization module 118. Each performance optimization system 205 may perform some or all of a performance optimization operation.

The performance optimization environment 200 includes a developer portion 210 (which may also be a manufacturer portion) and a user portion 212. In various embodiments, the developer portion 210 includes a test system 220 (which may also be an information handling system 100) which interacts with the information handling system 100 for which the performance is being optimized. In various embodiments the developer portion 210 includes a repository of performance data 230. In certain embodiments, the information handling system for which the performance is being optimized includes application specific system configuration options. The user portion 212 includes an information handling system 100 which corresponds to some or all of the application specific system configuration options of the information handling system 100 from the developer portion 210. In various embodiments the user portion 212 includes a repository of performance data 240.

Figure 3:
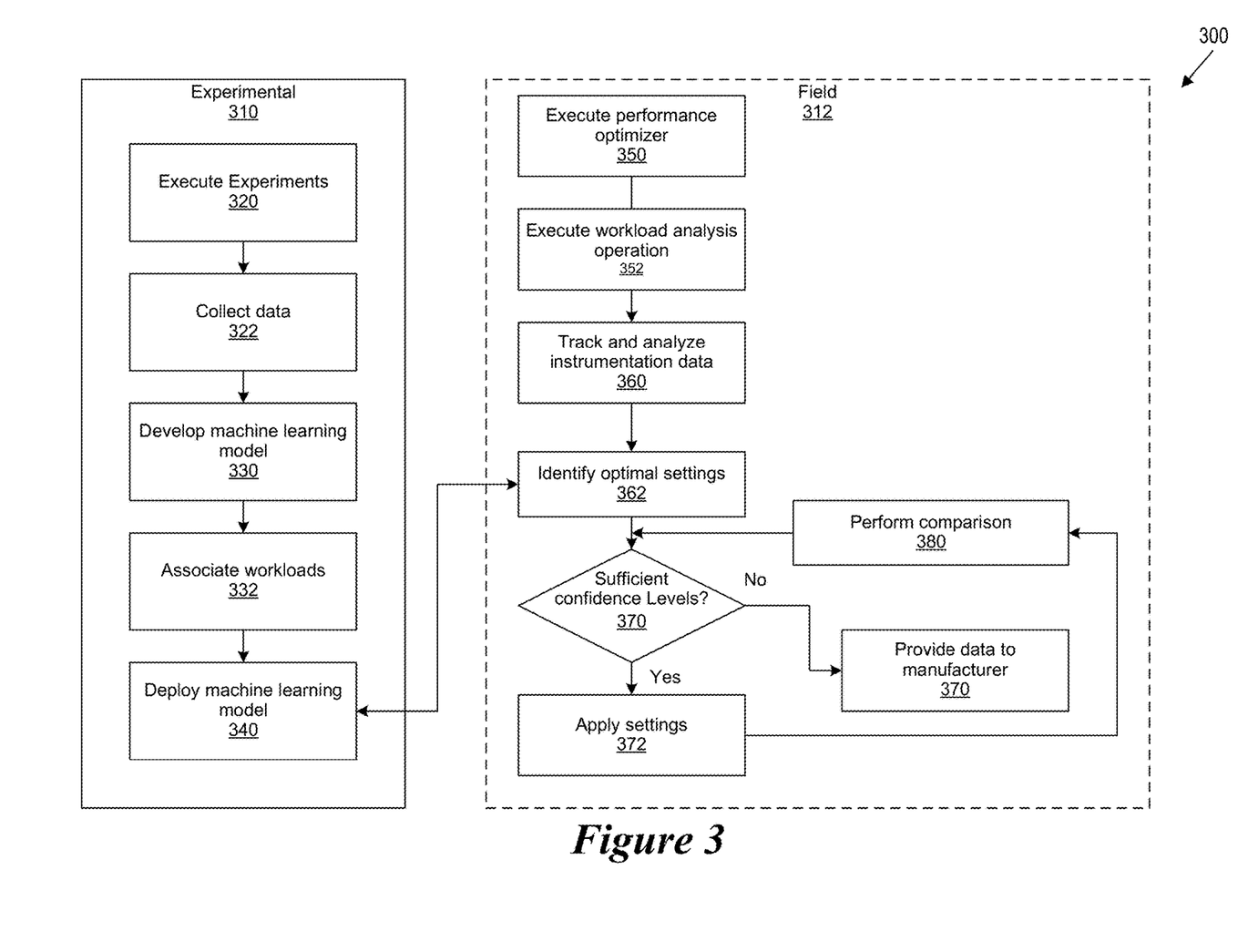
FIG. 3 shows a flow chart of a performance optimization operation.

Referring to FIG. 3, a flow chart of a performance optimization operation 300 is shown. The performance optimization operation 300 includes an experimental (i.e., laboratory) operation 310 which is performed for example at the developer portion 210 by a test system 212. The performance optimization operation 300 also includes a field operation 312 which is performed for example via the user portion 212.

The experimental operation 310 starts at step 320 by a test system 212 executing experiments on certain selected configurations and system settings in a laboratory setting. By executing the experiments in a laboratory setting, some or all of the configuration variables and system setting variables can be controlled by the tester. Next, at step 322 the test system 212 collects sensor and/or instrumentation data generated when performing the experiments. At step 330, the performance optimization operation 300 develops a machine learning model to classify workloads. For the purposes of this disclosure a workload is combination of single or multiple applications that are executed on a user's system. A workload is measured and characterized using instrumentation data on how the workload exercises the cpu, mem, storage, graphics, network sub-systems on the compute device. The instrumentation data on each sub-system can include hundreds of parameters. For example, for measurement of a processor, the performance optimization operation may measure utilization, activity by core, processor queue length, turbo frequency, C-state residency, etc. At step 332, the performance optimization operation 300 associates workloads with respect to optimal system settings and at step 340, the performance optimization operation 300 deploys the model.

The field operation 312 executes asynchronously of the experimental operation 310. The field operation 312 starts at step 350 by a user accessing and initiating a performance optimizer such as the performance optimization system 205. At step 352, the user executes a workload analysis feature via the performance optimization system 205. In certain embodiments, the workload analysis is applied to a particular system configuration of the information handling system on which performance is being optimized.

Next, at step 360, the performance optimization system 205 tracks and analyzes instrumentation data that is obtained during the workload analysis. The data is then analyzed using the trained machine learning model developed at step 330 and deployed at step 340. The analysis identifies optimal settings for the information handling system on which performance is being optimized at step 362. Next, at step 370 the performance optimization system 205 reviews the identified optimal settings to determine whether the optimal settings have been determined with a sufficient confidence level (e.g., a confidence level of greater than 95% compensated for false positives).

If the identified optimal settings have been determined with sufficient confidence levels, then the performance optimization system 205 automatically applies the settings to the information handling system at step 372. If the identified optimal settings have not been determined with a sufficient confidence levels, then the performance optimization system 205 provides the workload data to the manufacturer to be used in further training of the model at step 374. Whether or not the identified optimal settings have been determined with sufficient confidence levels, the performance optimization system 205 performs a comparison operation at step 380. The comparison operation measures and compares the performance of the system before and after the performance optimization operation is performed. In certain embodiments, the comparison operation takes into account the settings that were applied at step 372.

Figure 4:
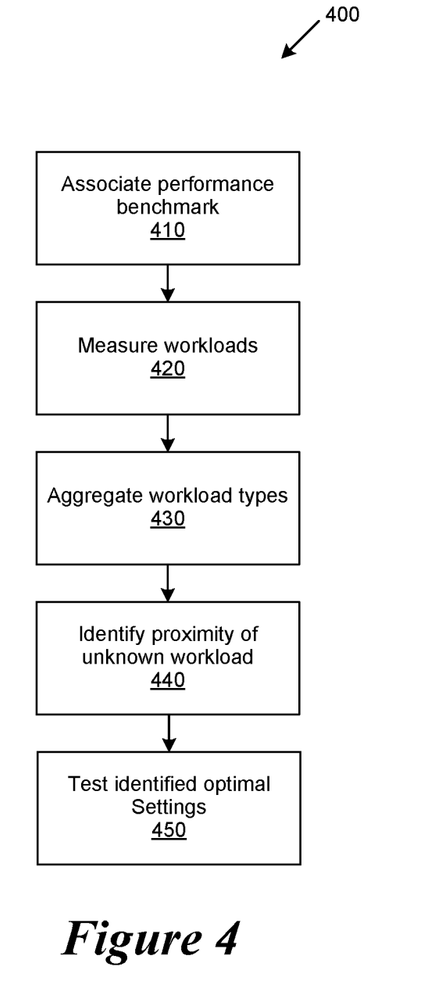
FIG. 4 shows a flow chart of a workload classification operation.

Referring to FIG. 4, a flow chart of a workload classification operation 400 is shown. In various embodiments, the workload classification operation 400 classifies unknown workloads into predefined performance clusters.

Figure 5:
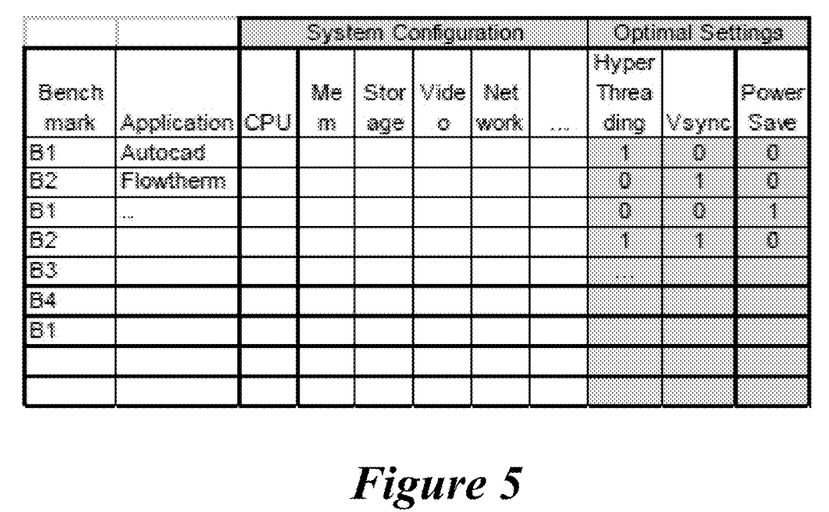
FIG. 5 shows an example association of performance benchmarks with particular types of loads.

More specifically, the workload classification operation 400 starts at step 410 by associating a performance benchmark that represents a particular type of load with certain optimal settings to execute the load. In certain embodiments, the optimal settings are identified by performing experiments on an information handling system in a controlled setting such as a laboratory. FIG. 5 shows an example association of performance benchmarks with particular types of loads.

Figure 6:
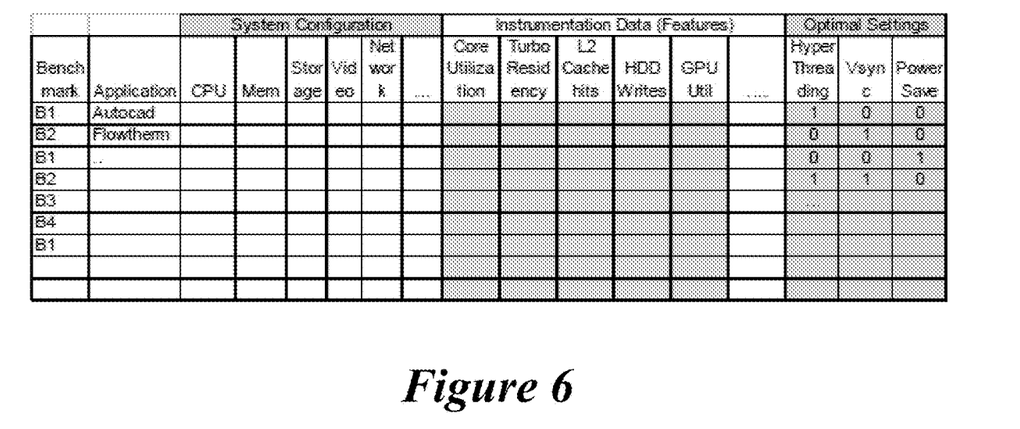
FIG. 6 shows an example workload characterization of instrumentation and features to optimal settings.

Next, at step 420, the workload classification operation 400 measures the workloads identified when instrumenting the systems in the laboratory with known optimal settings (such as the workloads identified during step 320). Measuring these workloads enables the workload classification operation to develop an association between the instrumentation data that characterizes the workload and the known optimal settings. When measuring the workloads at step 420, it is desirable to select the appropriate features from the instrumentation data that presents the attribute. For example, for a turbo mode attribute which is measured over time during the workload execution, an appropriate feature may be time spent in turbo mode as a percent of time taken to complete the workload. FIG. 6 shows an example workload characterization of instrumentation and features to optimal settings.

Next, at step 430, the workload classification operation 400 aggregates workload types into clusters representing a number of distinct optimal settings. The aggregation of workload types develops an association of cluster centroids and optimal settings. In certain embodiments, this step can be optional. For example, if the number of iterations used to aggregate workload types is small (e.g., fewer than four) and there is good and obvious separation between instrumentation data and optimal settings, then it might not be necessary to develop an association of cluster centroids and optimal settings.

Figure 7:
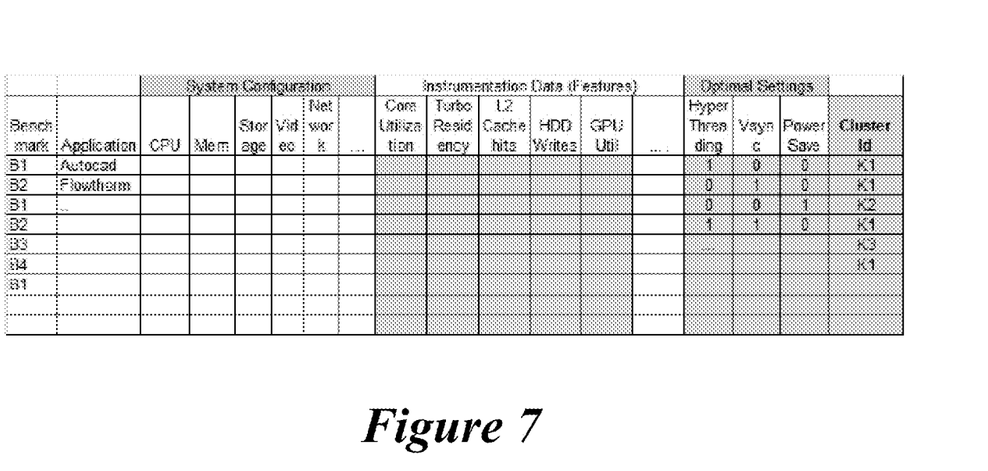
FIG. 7 shows an example of an association of workload clusters with optimal settings.

However, in many instantiations, it is desirable to perform the aggregation operation. When performing the aggregation operation a non-hierarchical clustering such as K-means is used to partition the dataset into K clusters. In certain embodiments, K is predefined based on the number of distinct optimal settings. For example, for a certain system being optimized, there may be three settings that can be optimized (e.g., a hyper-threading setting, a Vsync setting, and a power saving state setting). If each setting has two possible states (e.g., an on state and an off state), then there are $2^3$ potential clusters (i.e., eight potential clusters). FIG. 7 shows an example of an association of workload clusters with optimal settings.

In certain embodiments, the initial seeds for the cluster can be the best representative workloads that benefit from the settings. In various embodiments, the best representative workloads comprise workloads with known labels. In certain embodiments, the workloads are clustered by minimizing the sum of the squares to partition the workloads into K disjoint subsets. In certain embodiments, the distance metric is calculated using Euclidean, Mahanalobis or other distance metrics.

In certain embodiments, it is assumed that workloads with same optimal settings will cluster around a single centroid and there will be good separation between the clusters. For the purposes of this disclosure a good separation means closely packed (i.e., minimal sum of squares) data points inside each cluster along with a maximum distance between cluster centroids. This ensure there is minimal overlap between the data points across each cluster More specifically, the distance metric D for features $u_1 \ldots u_n$ from instrumentation data for iterations $1 \ldots n$ can be defined as:

$$D_{u_{1-2}} = \sqrt{\Sigma_{i-1}^n (u_{1i} - u_{2i})^2}$$

Where $D_{u_{1-2}}$ is the Euclidean distance between points $u_1$ and $u_2$ and each point $u_1, u_2 \ldots u_n$ are vectors. For example, ui is a vector of the ith observation (of for example CPU utilization, #of threads, turbo frequency, etc.) The metric J for features $u_1 \ldots u_n$ from instrumentation data for iterations $1 \ldots n$ can be defined as:

$$J = \Sigma_{j-1}^k \Sigma_{nes_j} |u_n - \mu_j|^2$$

Next, at step 440, the workload classification operation 400 identifies the proximity of new unknown workload to a known cluster. More specifically, when a new workload needs a profile, the user executes a workload analysis operation via the performance optimizer. This workload analysis operation tracks the same instrumentation that was used for characterizing the workloads during step 420.

Using the data obtained when executing the workload analysis operation (which are over time), features are extracted to using the previously defined dataset. The workload classification operation 400 measures the nearest cluster to this data-point using a distance or similarity (e.g., Cosine similarity) measure.

More specifically, for a new workload W, the minimum distance of W from K centroids is calculated as:

$$D_{\overline{wk}} = \text{Min}(\sqrt{\Sigma_{i-1}^K (w_{1i} - c_{1i})^2})$$

For example, if the cluster with the minimum distance to W is k2. Then, the cluster k2 is most similar to the new unknown workload. The performance optimization operation then applies the optimal settings for cluster k2 to the workload W.

In embodiments where K-means clustering was not used for reducing the dataset into fewer clusters, then a K-Nearest Neighbor (KNN) operation is used to assign the settings. The KNN operation provides an unsupervised machine learning operation which allows classification of datasets in cluster. Other unsupervised machine learning operations that allow clustering of datasets are also contemplated. In these embodiments, the new workload data is compared for similarity with N nearest datasets to provide the setting. However, use of the KNN operation in the user portion 212 can be challenging to scale as a KNN operation does not necessarily include a training phase and all computations are in testing. Specifically, the size of the data used when performing the KNN operation increases with time, thus causing the time needed to execute this model to increase.

Figure 8:
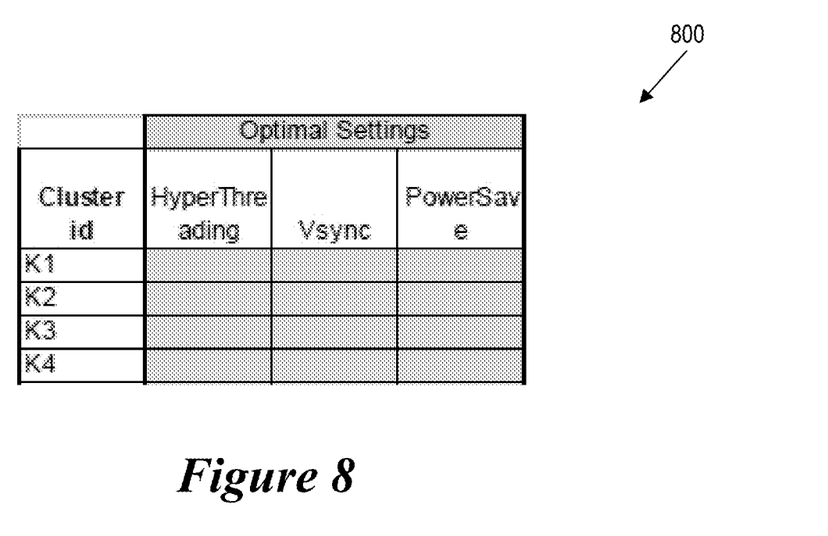
FIG. 8 shows an example confusion matrix.

Next, at step 450, the workload classification operation 400 tests the identified optimal settings. When testing the identified settings, the workload classification operation 400 tests the system using known workloads having known optimal settings. In certain embodiments, the workloads are executed using a workload analysis feature of the optimization system. In certain embodiments, the instrumentation data is then analyzed using the identified proximate centroid identified during step 440. In certain embodiments, the testing includes generating and accessing a confusion matrix of results after running the tests using a plurality of known workloads. FIG. 8 shows an example confusion matrix 800. If the confusion matrix is not satisfactory, then the workload classification operation revisits the feature selection and clustering determinations. A confusion matrix with a high number of false positives (e.g., greater than 20%) or where the overall accuracy of the model is less than 95% are examples of an unsatisfactory confusion matrix. For the purposes of this disclosure, a confusion matrix is a table that is used to describe the performance of the classification model on a set of test data for which the true values are known. The classification model compares the results of actual clusters with the results of the predicted cluster.

Figure 9:
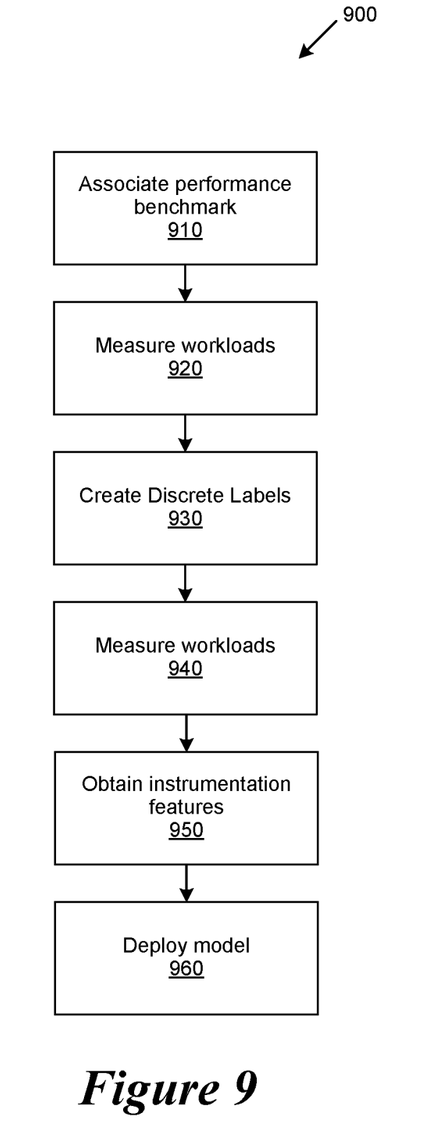
FIG. 9 shows a flow chart of a supervised learning operation.

Referring to FIG. 9, a flow chart of a supervised learning operation 900 is shown. In various embodiments, the supervised learning operation 900 develops a relationship between instrumentation data collected when executing a workload and the optimal settings for that workload.

More specifically, the supervised learning operation 900 starts at step 910 by associating a performance benchmark that represents a particular type of load with certain optimal settings to execute the load. In certain embodiments, the optimal settings are identified by performing experiments on an information handling system in a controlled setting such as a laboratory. FIG. 10 shows an example association of performance benchmarks with particular types of loads.

Next, at step 920, the supervised learning operation 900 measures the workloads identified during step 910 by instrumenting the systems in the laboratory with both optimal settings and non-optimal settings. FIG. 6 shows an example of the results of the measuring.

The supervised learning operation 900 uses the non-optimal settings for building a supervised learning model that is used to partition the instrumentation data into optimal runs as well as non-optimal runs. Thus, building a supervised learning model that includes the non-optimal settings improves the accuracy of the model.

Next, at step 930 the setting values are concatenated to create discrete labels for each setting. Next, at step 940, the supervised learning operation 900 measures the workloads identified when instrumenting the systems in the laboratory with known optimal settings (such as the workloads identified during step 320). Measuring these workloads enables the supervised learning operation 900 to develop an association between the instrumentation data that characterizes the workload and the known optimal settings. When measuring the workloads at step 940, it is desirable to select the appropriate features from the instrumentation data that presents the attribute. For example, for a turbo mode attribute which is measured over time during the workload execution, an appropriate feature may be time spent in turbo mode as a percent of time taken to complete the workload. FIG. 6 shows an example workload characterization of instrumentation and features to optimal settings.

Next, at step 950 a plurality of instrumentation features are obtained from a plurality of sensors (i.e., probes). More specifically, instrumentation features are identified as X which are then provided with a corresponding label Y.

Thus, instrumentation features X1 to Xn, for N sensors (probes) may be set forth as:

$$X_i = [X_1, X_2, \ldots, X_N]$$

Where each instrumentation feature has a corresponding Y. The function f maps x to y, which is shown as:

$$f : X \to Y$$

When developing the supervised learning model, the supervised learning operation uses a larger dataset of workload iterations (i.e., a dataset which includes over a thousand observations per variable). The data is divided into train, test, and validation sets. Models are built using the training set and the validation data set is used for X-fold validation. The X-fold validation ensures that the predictive model performs as expected beyond the dataset that was used to build the model. The X-fold validation breaks the data into X equal groups and then uses X−1 groups to build the model and uses to model to predict the result for the Xth group.

Because this is a multi-class issue that is implemented on a client system, it is important to select an appropriate supervised learning model. In various embodiments, the model is based on at least one of a plurality of supervised learning models. More specifically, the model may be based on a K-Nearest Neighbors model, a Naïve Bayes model, a Recursive Partitioning using ctree model, a Random Forest model and/or a Boosted Classification model.

The model that is ultimately selected is the model that provides the best cross validation performance and lowest out of bag (OOB) error. Additionally, the computational complexity of implementing the model in a programming language that is consistent with the programming language of the performance optimizer such as a C++ programming language is also considered.

Next, at step 960, the model is deployed to the performance optimizer. In certain embodiments, the workloads are executed using a workload analysis feature of the optimization system. Performing the workload analysis provides instrumentation data that can be run against the trained model. The model labels the workloads with confidence levels. In certain embodiments, the models are directly associated with optimization settings and the performance optimizer automatically applies the optimal settings to the system being optimized.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for optimizing performance of an information handling system comprising:

executing experiments on selected system configurations and system configuration settings on a test system, the experiments comprising applying a set of system configuration settings to the test system and testing performance of the test system when executing known workloads with the set of system configuration settings, the testing performance comprising measuring and characterizing a workload using instrumentation data on how the workload uses a plurality of sub-systems of the test system;

developing a statistical model for use when optimizing the performance of the information handling system, the statistical model being developed based upon the measuring and characterizing the workload, the statistical model being developed to classify workloads, each workload comprising a combination of a single application or multiple applications executed on an information handling system, the characterizing the workload comprising aggregating workload types into clusters of workload types, each of the clusters of workload types representing a number of distinct system configuration settings;

sampling the performance of the information handling system, the sampling being performed iteratively;

adjusting the performance of the information handling system by applying optimized system configurations to the information handling system, the optimized system configurations comprising optimized parameters, the optimized parameters being based upon the statistical model;

characterizing workloads in operation at runtime to analyze the performance of the information handling system;

identifying parameters to be changed to obtain optimal performance based upon the characterizing, optimal performance being an increase in performance of the information handling system when compared with performance of the information handling system without the parameters being changed; and wherein the aggregation of workload types develops an association of cluster centroids and optimal settings, optimal settings comprising settings which increase performance of the information handling system when compared with performance of the information handling system without application of the optimal settings;

the aggregation of workload types is performed via an aggregation operation, the aggregation operation using non-hierarchical clustering to partition a dataset into clusters, the non-hierarchical clustering comprising K means clustering; and the K means clustering partitions the dataset into K clusters where K is predefined based on a number of distinct optimal settings, the distinct optimal settings comprising settings which increase performance of the information handling system when compared with performance of the information handling system without application of the distinct optimal settings, the distinct optimal settings comprising at least one of a hyperthreading setting, a Vsync setting and a power saving state setting.

2. The method of claim 1, wherein:
the adjusting is performed dynamically for varying workloads, the varying workloads comprising random stochastic variation in workload, abrupt user or operating system level discontinuities.

3. The method of claim 2, wherein:
the workloads being classified comprise known workloads and unknown workloads.

4. The method of claim 1, wherein:
the statistical model comprises a supervised learning operation, the supervised learning operation statistically mapping system parameters to optimal parameter settings, optimal parameter settings comprising parameter settings which increase performance of the information handling system when compared with performance of the information handling system without application of the optimal parameter settings.

5. The method of claim 1, further comprising:
reviewing the optimized system configuration to determine whether the optimized parameters have been determined with a sufficient confidence level, the sufficient confidence level comprising a confidence level of greater than 95%.

6. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:

executing experiments on selected system configurations and system configuration settings on a test system, the experiments comprising applying a set of system configuration settings to the test system and testing performance of the test system when executing known workloads with the set of system configuration settings, the testing performance comprising measuring and characterizing a workload using instrumentation data on how the workload uses a plurality of sub-systems of the test system, the characterizing the workload comprising aggregating workload types into clusters of workload types, each of the clusters of workload types representing a number of distinct optimal system configuration settings;

developing a statistical model for use when optimizing the performance of the information handling system, the statistical model being developed based upon the measuring and characterizing the workload, the statistical model being developed to classify workloads, each workload comprising a combination of a single application or multiple applications executed on an information handling system;

sampling the performance of the information handling system, the sampling being performed iteratively;

adjusting the performance of the information handling system by applying optimized system configurations to the information handling system, the optimized system configurations comprising optimized parameters, the optimized parameters being based upon the statistical model;

characterizing workloads in operation at runtime to analyze the performance of the information handling system;

identifying parameters to be changed to obtain optimal performance based upon the characterizing, optimal performance being an increase in performance of the information handling system when compared with performance of the information handling system without the parameters being changed; and wherein the aggregation of workload types develops an association of cluster centroids and optimal settings, optimal settings comprising settings which increase performance of the information handling system when compared with performance of the information handling system without application of the optimal settings;

the aggregation of workload types is performed via an aggregation operation, the aggregation operation using non-hierarchical clustering to partition a dataset into clusters, the non-hierarchical clustering comprising K means clustering; and the K means clustering partitions the dataset into K clusters where K is predefined based on a number of distinct optimal settings, the distinct optimal settings comprising settings which increase performance of the information handling system when compared with performance of the information handling system without application of the distinct optimal settings, the distinct optimal settings comprising at least one of a hyperthreading setting, a Vsync setting and a power saving state setting.

7. The system of claim 6, wherein:
the adjusting is performed dynamically for varying workloads, the varying workloads comprising random stochastic variation in workload, abrupt user or operating system level discontinuities.

8. The system of claim 6, wherein:
the workloads being classified comprise known workloads and unknown workloads.

9. The system of claim 6, wherein:
the statistical model comprises a supervised learning operation, the supervised learning operation statistically mapping system parameters to optimal parameter settings.

10. A non-transitory, computer-readable storage medium embodying computer program code, the computer program code comprising computer executable instructions configured for:

executing experiments on selected system configurations and system configuration settings on a test system, the experiments comprising applying a set of system configuration settings to the test system and testing performance of the test system when executing known workloads with the set of system configuration settings, the testing performance comprising measuring and characterizing a workload using instrumentation data on how the workload uses a plurality of sub-systems of the test system;

developing a statistical model for use when optimizing the performance of the information handling system, the statistical model being developed based upon the measuring and characterizing the workload, the statistical model being developed to classify workloads, each workload comprising a combination of a single application or multiple applications executed on an information handling system, the characterizing the workload comprising aggregating workload types into clusters of workload types, each of the clusters of workload types representing a number of distinct system configuration settings;

sampling the performance of the information handling system, the sampling being performed iteratively;

adjusting the performance of the information handling system by applying optimized system configurations to the information handling system, the optimized system configurations comprising optimized parameters, the optimized parameters being based upon the statistical model;

characterizing workloads in operation at runtime to analyze the performance of the information handling system;

identifying parameters to be changed to obtain optimal performance based upon the characterizing, optimal performance being an increase in performance of the information handling system when compared with performance of the information handling system without the parameters being changed; and wherein the aggregation of workload types develops an association of cluster centroids and optimal settings, optimal settings comprising settings which increase performance of the information handling system when compared with performance of the information handling system without application of the optimal settings;

the aggregation of workload types is performed via an aggregation operation, the aggregation operation using non-hierarchical clustering to partition a dataset into clusters, the non-hierarchical clustering comprising K means clustering; and the K means clustering partitions the dataset into K clusters where K is predefined based on a number of distinct optimal settings, the distinct optimal settings comprising settings which increase performance of the information handling system when compared with performance of the information handling system without application of the distinct optimal settings, the distinct optimal settings comprising at least one of a hyperthreading setting, a Vsync setting and a power saving state setting.

11. The non-transitory, computer-readable storage medium of claim 10, wherein:
the adjusting is performed dynamically for varying workloads, the varying workloads comprising random stochastic variation in workload, abrupt user or operating system level discontinuities.

12. The non-transitory, computer-readable storage medium of claim 10, wherein:
the workloads being classified comprise known workloads and unknown workloads.

13. The non-transitory, computer-readable storage medium of claim 10, wherein:
the statistical model comprises a supervised learning operation, the supervised learning operation statistically mapping system parameters to optimal parameter settings.

* * * * *